United States Patent [19]

Swisher et al.

[11] Patent Number: 5,247,004

[45] Date of Patent: Sep. 21, 1993

[54] POLYMERIC-CONTAINING COMPOSITIONS WITH IMPROVED OXIDATIVE STABILITY

[75] Inventors: Robert G. Swisher, Pittsburgh; Johnson C. Watkins; Peter C. Gaa, both of Wexford; James W. Kasunic, Sarver, all of Pa.

[73] Assignee: PPG Industries, Inc., Pittsburgh, Pa.

[21] Appl. No.: 912,448

[22] Filed: Jul. 13, 1992

Related U.S. Application Data

[60] Division of Ser. No. 515,533, Apr. 27, 1990, Pat. No. 5,130,198, which is a continuation of Ser. No. 360,594, Feb. 3, 1989, abandoned.

[51] Int. Cl.$^5$ ................................ C08K 3/40
[52] U.S. Cl. ................................ 524/494; 428/378
[58] Field of Search ................. 524/494; 428/378

[56] References Cited

U.S. PATENT DOCUMENTS

| | | | |
|---|---|---|---|
| 2,946,762 | 7/1960 | Kocay | 260/29.6 |
| 2,960,486 | 11/1960 | Pye | 260/45.7 |
| 3,018,262 | 1/1962 | Schroeder | 260/29.2 |
| 3,108,990 | 10/1963 | Baxter | 260/45.7 |
| 3,298,995 | 1/1967 | Bloor et al. | 260/45.85 |
| 3,352,816 | 11/1967 | Meyer et al. | 260/45.7 |
| 3,414,532 | 12/1968 | Hecker et al. | 260/23 |
| 3,535,249 | 10/1970 | Larson | 260/23 |
| 3,565,840 | 2/1971 | Mirabile et al. | 260/23 |
| 3,655,828 | 4/1972 | Rushton | 260/880 R |
| 3,901,848 | 8/1975 | Dibattista et al. | 260/45.8 N |
| 3,933,737 | 1/1976 | Glander et al. | 260/45.9 NC |
| 4,009,317 | 2/1977 | Chase et al. | 428/378 |
| 4,043,976 | 8/1977 | Yoshikawa et al. | 260/45.85 N |
| 4,052,362 | 10/1977 | Yoshikawa et al. | 260/45.9 NC |
| 4,054,695 | 10/1977 | Johnson | 427/390 D |

(List continue on next page.)

FOREIGN PATENT DOCUMENTS

| | | |
|---|---|---|
| 58-79069 | 11/1981 | Japan . |
| 57-22144 | 2/1982 | Japan . |
| 58-21837 | 5/1982 | Japan . |
| 958390 | 5/1964 | United Kingdom . |
| 1087162 | 10/1967 | United Kingdom . |

OTHER PUBLICATIONS

Textile Paper Chemicals Bulletin entitled "Experimental Emulsion E-693" from Rohm & Haas Company, Philadelphia, Pennsylvania.

Product Bulletin entitled "Rucothane Polyurethane Latexes" from Ruco, Division of Hooker Chemical Corp. (now Ruco Polymer Company).

Product Bulletin entitled "Baybond XW-116" from Mobay Corp. (now Miles USA), Coatings Division.

Product brochure entitled "Plastics Additives Cyanox® 711 Antioxidant" from Cyanamid, Polymer Products Division, Wayne, New Jersey 07470.

U.S. Patent Appln. Ser. No. 07,215,190, filed Jul. 5, 1988, entitled "Chemical Treatment for Fibers and Reinforcement for Polymer Matrices Resulting in Good Solvent Resistance".

"Coordinating Compounds" from Kirk and Othmer Encyclopedia of Chemical Technology, vol. 6, 1965, pp. 122-130.

"Blocked Isocyanates in Coatings" by J. W. Rosthauser, et al., from Mobay Chemical Corp. (now Miles USA), Polyurethane Division, Pittsburgh, Pennsylvania.

Primary Examiner—Veronica P. Hoke
Attorney, Agent, or Firm—Kenneth J. Stachel

[57] ABSTRACT

Polymeric-containing compositions having improved oxidative stability have the polymer and at least two stabilizing agents. The composition can be a coating composition for substrates including those like fibrous material including fibers, bundles of fibers, strands, roving, flakes and beads. The composition can be present as a dried residue on the substrate. For Fibrous substrates, the composition also has at least one organofunctional silane coupling agent, may also have processing aids such as epoxy polyester polymers and/or lubricants. In addition, the polymeric-containing composition can have a crosslinking agent in an effective amount to produce a dried residue of limited swellability from the composition.

13 Claims, 2 Drawing Sheets

U.S. PATENT DOCUMENTS

| Patent # | Date | Inventor | Class |
|---|---|---|---|
| 4,200,707 | 4/1980 | Richardson | 525/2 |
| 4,252,852 | 2/1981 | Goth | 428/336 |
| 4,271,229 | 6/1981 | Temple | 428/288 |
| 4,291,095 | 9/1981 | Chase et al. | 428/391 |
| 4,324,879 | 4/1982 | Bock et al. | 528/45 |
| 4,341,677 | 7/1982 | Tamosauskas | 523/421 |
| 4,408,005 | 10/1983 | Byrne | 524/421 |
| 4,423,199 | 12/1983 | Chang et al. | 526/307.6 |
| 4,450,197 | 5/1984 | Hager et al. | 428/232 |
| 4,483,948 | 11/1984 | Tamosauskas | 523/205 |
| 4,501,852 | 2/1985 | Markusch et al. | 524/591 |
| 4,507,342 | 3/1985 | Kielbania, Jr. | 428/90 |
| 4,551,382 | 11/1985 | Gagne et al. | 428/258 |
| 4,581,405 | 4/1986 | Martischius | 524/417 |
| 4,608,304 | 8/1986 | Rosthauser | 428/378 |
| 4,636,437 | 1/1987 | Algrim et al. | 428/391 |
| 4,711,924 | 12/1987 | Salensky | 524/402 |
| 4,826,894 | 5/1989 | Markusch et al. | 523/415 |
| 4,855,490 | 8/1989 | Markusch et al. | 560/355 |
| 4,863,989 | 9/1989 | Obayashi et al. | 524/419 |
| 4,879,322 | 11/1989 | Markusch et al. | 523/322 |
| 4,904,522 | 2/1990 | Markusch | 428/288 |
| 4,925,885 | 5/1990 | Rosthauser et al. | 523/415 |
| 4,990,349 | 2/1991 | Delvin et al. | 523/209 |
| 5,086,101 | 2/1992 | Garrett et al. | 524/188 |

POLYMERIC-CONTAINING COMPOSITIONS WITH IMPROVED OXIDATIVE STABILITY

This application is a division of application Ser. No. 07/515,533, filed Apr. 27, 1990 and issued as U.S. Pat. No. 5,130,198, which is a continuation of application Ser. No. 07/306,594, filed Feb. 3, 1989, now abandoned.

The present invention is directed to polymeric-containing compositions like chemical treating or coating compositions, treated substrates and polymers. In one aspect the polymeric-containing composition is for coating substrates including fibers, bundles of fibers, strands and roving, in general any shape of reinforcement material for polymers and the resulting chemically treated substrate. In another aspect the polymeric-containing composition is for producing polymers and polymeric coatings having good oxidative stability. The chemically treated reinforcement is useful in forming reinforced polymers or plastics having improved oxidative stability including longer term heat stability. The polymeric-containing composition of the present invention is useful as coatings having a reduced tendency for yellowing and are useful as hydraulic fluids with improved stability.

Many polymers and polymeric coatings may deteriorate on extended exposure to elevated temperatures and/or atmospheric conditions resulting in reduced usefulness. Polyurethane polymers such as polyesterurethanes, polyesterpolyols, and thermoplastic polyesters and polyoxyalkylenes have varying degrees of heat and/or oxidative instability over varying periods of exposure to high temperatures and/or atmospheric conditions. When these polymers are applied as coatings to substrates, the coated substrate may discolor or yellow over time at elevated temperatures or at atmospheric conditions. This discoloration can occur to these polymers when they are used as components of coatings on reinforcement for matrix polymers or as the matrix polymer.

Polymer reinforcement is a major use of many fibrous materials by the FRP (fiber reinforced plastics) industry. Glass fibers are a type of reinforcement for polymers in FRP. Typically, the production of glass fibers entails formation of a plurality of fibers from molten streams of glass at speeds up to around 15,000 feet per minute. The glass fibers require protection from intrafilament abrasion during their production and improved compatibility between their hydrophilic, smooth inorganic surface and the oleophilic organic polymers and resins that they reinforce. The use of a chemical treatment that is applied to the fibers during their formation (hereinafter referred to as "size") provides some of this protection and compatibility. Typically, the size is an aqueous solution, emulsion, dispersion, foam, or gel having film forming polymers, coupling or keying agents, lubricants and possibly emulsifiers, wetting agents or processing aids.

The expansion of applications of reinforced polymers has resulted in a desire to produce reinforced polymer parts for use in more difficult environments of temperature and atmospheric conditions. For instance, reinforced polymeric parts find increasing utilization in the automotive industry in such applications as housings and containing that are subjected to the higher temperatures around an internal combustion engine. For example, FRP products are finding utility as oil pans and radiator parts that encapsulate the core of the radiator. Additionally, polymeric coatings and paints are sought that have reduced yellowing when applied to various substrates or when exposed to the environment. Also, polymeric hydraulic fluids and the like that have improved oxidative stability would be well received.

It is an object of the present invention to provide coatings for substrates like sizes for fibers and reinforcement for use in reinforced polymers that have good oxidative stability to result in longer term heat aging of the reinforced plastic to retard discoloration or a great loss of reinforcement properties.

It is a further additional object to provide sized fibers and reinforcement for use with matrix polymers to provide good oxidative stability of a reinforced matrix polymer part while maintaining good initial strength properties of the reinforced polymer.

Another additional object is to provide coatings and polymeric materials with improved oxidative stability.

SUMMARY OF THE INVENTION

The aforementioned objects and other objects gleaned from this disclosure come to fruition from the polymeric-containing composition, coatings, sizes and sized fibers and reinforcement of the present invention.

One aspect of the present invention is a polymeric-containing composition with improved oxidative stability. The polymer is thermoplastic or thermosetting such as: a polyurethane, including polyester urethane and polyether urethane and polyurea-urethane, polyoxyalkylene like poly(oxyethylene-oxypropylene)copolymers and thermoplastic polyesters. The polymeric composition also has effective stabilizing amounts of stabilizing agents selected from: metal deactivating agents such as polydentate ligands like ethylenediaminetetraacetic acid (EDTA), low temperature antioxidant, and higher temperature antioxiant. Additionally, a crosslinking agent may be present.

In another aspect of the present invention the composition is a coating composition for substrates and it and the coated substrate have the following components. There is at least one thermoplastic and/or curable film forming polymer, and at least two stabilizing agents selected from metal deactivating agents, low temperature antioxidant, and higher temperature antioxidants, and a carrier in an effective amount of applying the coating to the substrate. Additionally a crosslinking agent may be present.

The film forming polymer is present either in an organic solvent or oil-in-water emulsion or dispersion or solution. The amount of the film forming polymers present in any of these forms is an effective film forming amount.

The coating composition is applied to substrates and/or fibers and/or reinforcement in a manner and in an amount to provide at least a thin discontinuous coating on the surface of the substrate, fibers and reinforcement when a substantial portion of the carrier is removed.

An additional aspect of the present invention has the coating composition as a size for treating fibrous and/or particular reinforcement for polymeric matrices. In this aspect the coating composition has a thermoplastic and/or curable polymer that is matrix-compatible and additionally has at least one glass resin coupling agent like organo-metallic agents such as an organofunctional silane coupling agent and/or hydrolysis products of this agent, or other coupling agents like Werner type coupling agents. Also includeable are fiber lubricants such as cationic and/or nonionic lubricants and/or epoxy polyester processing aids in effective lubricating or process aiding amounts.

In any of the polymeric-containing compositions the selection of the specific stabilizing agents and crosslinking agent depends on the particular aspect and the application. For the crosslinking agent when present, the water-dispersible, blocked di- or polyisocyanates are useful when the polymer of the polymer-containing composition is polyurethane polymer. The effective amounts of the crosslinker for the polymer are those to assist in forming a coating when the coating composition forms a film. The stabilizing agent that is the metal deactivating agent is one like those having the formula:

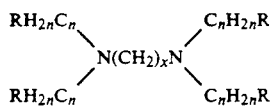

wherein 'x' is an integer with a value from 1 to about 6 and 'n' is an integer with a value from 1 to about 6 and R is a carboxyl or hydroxyl group or the salts, ethers or esters thereof, and/or polydenate ligands.

DETAILED DESCRIPTION OF THE INVENTION

Figure 1A:
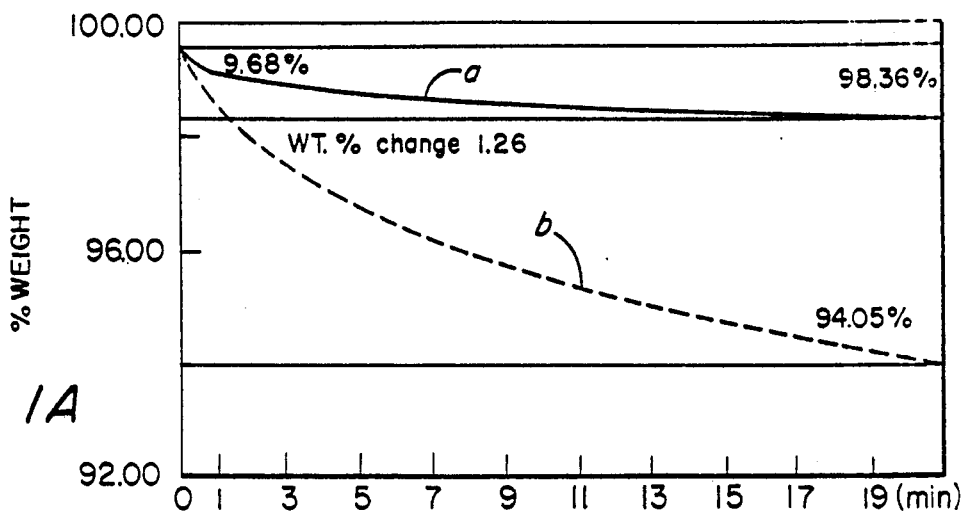
FIG. 1 is a series of three, FIG. 1(A) through FIG. 1(C), isothermal gravimetric analysis graphs for thermal analysis at three different temperatures of films of coating compositions of the present invention compared to an illustrative film example.

The polymer in the polymeric-containing composition can be useful in the liquid form as a film former in a coating composition or as a liquid polymeric material such as hydraulic or heat exchange fluids. In all of the other forms the polymer is useful in forming coatings and films. Nonexclusive examples of the liquid polymers include polyalkylene glycols, polyoxyalkylene glycols and the like where the alkyl groups are ethylene and propylene or copolymer combinations thereof. Nonexclusive examples of the polymer for the other forms to prepare coatings and films include polyvinylalcohol, polyolefin latexes that are unoxidized or oxidized, polyvinylacetate, epoxy, starch, polyalkylene glycols, polyoxyalkylene glycols where the alkyl group is ethylene or propylene or copolymer combinations thereof, and polyurethanes, including polyester urethanes, polyureaurethanes and polyetherurethanes. All of these polymers in the various recited forms can have improved oxidative stability through the present invention. Additionally, matrix polymers of fiber reinforced polymers can indirectly benefit with improved oxidative stability by the presence of the coating of the present invention (size) on the reinforcement in the matrix polymer. Such matrix polymers include polyurethanes, polybutylene terephthalate, polyacetals, polypropylene and the like.

By film forming material it is meant that upon removal of any solvents and/or volatiles present in the emulsion, dispersion, suspension or solution of the polymeric-containing composition the polymer can coalesce to form a film on the surface of a substrate; for example monolithic or fibrous material. The term "fibrous material" may include on fiber, fibers, a bundle of fibers, strands, rovings and other collections of strands and fibers and also includes other polymeric reinforcing materials such as fibrils, flakes, beads and the like.

When the polymeric-containing composition is a coating composition for substrates that reinforce polymeric materials, the polymer film forming material is a matrix compatible polymer. By "matrix compatible polymer" it is meant that the polymer does not degrade or reduce the mechanical properties of the fiber reinforced polymer over those mechanical properties objected from fiber reinforced polymers having no film polymer present in the coating composition. A few nonexclusive examples of this compatibility is the use of polyurethane film forming polymers without the presence of epoxy film forming polymers when the matrix polymer is polyamide like nylon. Another example is the film forming polymer of the coating is not a polyurethane, but rather an epoxy and/or polyvinylalcohol combination of film formers when the matrix polymer is polyacetal. Another example is the film forming polymer is a combination of polyurethane and epoxy polymers when the matrix polymer is polybutylene terephthalate. The polyurethane, epoxy, polyvinylalcohol polymers and other film forming polymers used in the coating composition can be any of these polymers known to those skilled in the art for forming coating compositions. For instance, these film forming polymers can be curable by removal of volatiles upon drying, by reaction with crosslinking agents, by radiation curing or a mixture thereof. A suitable example of such a film forming polymer is a crosslinkable polyurethane polymer.

The crosslinkable polyurethane polymer is any aliphatic or aromatic or mixed aliphatic and aromatic polyurethane known to those skilled in the art to be a film forming polymer for utilization with fibrous materials. The preferred polyurethane is a thermoplastic aliphatic polyurethane utilized in the chemical treating composition as an oil-in-water emulsion. Suitable examples of such polyurethanes are given in U.S. Pat. Nos. 4,271,229 and 4,615,946 (Temple) hereby incorporated by reference. Other suitable examples include chain extended thermoplastic polyurethanes derived from chain extension of an isocyanate-terminated prepolymer prepared by the reaction of an aliphatic or cycloaliphatic diisocyanate with organic compounds containing active hydrogens like those shown in U.S. Pat. No. 4,582,873, hereby incorporated by reference. A few nonexclusive examples of these active hydrogen organic compounds are diols and polyols known in the art and polyester polyol, polyether polyol, polyalkylene diols and the like. The amount of the polyurethane polymer is an effective film forming amount derived from the coating composition. A suitable polyurethane emulsion is Rucothane latex having a trade designation of 2011L available from Ruco Chemical Corp. from New York. This material along with other Rucothane polyurethane latices, are thermoplastic polyurethane latices comprised of high molecular weight aliphatic isocyanate-based thermoplastic elastomers in a water dispersion with an anionic or nonionic surfactant, where the dispersion or latex has varying particle sizes. The latices typically have a polymer solids content ranging from around 55 to 65 percent by weight where the urethane polymer has an ester backbone. Also, polyurethane polymers made with isocyanates designated "Desmodur W" available from Mobay Chemical Company may be used. Generally, the amount of the film forming polymer present in the coating composition is an effective film forming amount. This amount is that equivalent to an amount of an emulsion of the film forming polymer ranging from a minor amount to a major amount of the solids in the composition so that an effective film forming amount of the polymer is in the composition. Preferably, the film forming polymer is present in an amount of about 10 to 95 and preferably 40–95 weight percent of the nonaqueous components or solids of the polymer containing composition and from about 2 to about 30 weight percent of the aqueous coating composition.

Of the at least two stabilizing agents present with the polymer one of the stabilizers can be a water soluble or dispersible metal deactivating agent such as the polydentate ligands including bi- to octa-dentates and/or compounds having the formula:

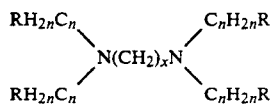

wherein x is an integer having a value of from 1 to about 6, preferably 1 to 4, and R is a carboxy group or hydroxy group or the salts, ethers or esters thereof. Examples of these well known compounds are ethylene diamine tetraacetic acid (an alkylene diamine(penta)dentate), propylene diamine tetraacetic acid as well as the sodium or potassium or ammonium salts thereof and appropriate chemical mixtures thereof and N,N,N,'N'-tetrakis(2-hydroxypropyl)ethlenediamine. The amount of this material present in the polymer-containing composition can be generally an effective metal chelating amount and preferably it is present in an amount of about 0.01 to about 2 percent of the nonaqueous components of the polymeric-containing composition. These amounts depend on the quantity of metals present in the polymeric-containing composition. Higher amounts of metals translate into higher amounts of metal deactivators being useful in the composition.

Another suitable stabilizing agent is an antioxidant that is effective at the temperatures of removing volatiles from the coating composition or of using the polymeric-containing composition. Generally, this refers to antioxidants that are effective at temperatures below around 250° to 300° F. When the coating composition is a size, this effective temperature is for drying chemically treated fibrous material to remove carriers such as water in forming the film or dried residue of the size on the fibrous material. Hereinafter these antioxidants are referred to as "low temperature antioxidants." Nonexclusive examples of such as antioxidant include: hydrosulfites, bisulfites, phosphorous acid and/or phosphites and phosphite-containing reducing agents selected from alkali metal, alkaline earth metal hypophosphites or hydrogen phosphites and ammonium hypo or hydrogen phosphites. The amount of the phosphite-containing reducing agent type antioxidant ranges from around 0.001 to around 2 weight percent of the nonaqueous solids of the polymeric-containing composition of the above and from about 1 weight percent or more for the other low temperature antioxidants. The preferred hypophosphite present is the sodium hypophosphite in amount up to around 1 and most preferably from 0.1 around 0.3 weight percent of the polymeric-containing composition. A suitable sodium hypophosphite is that available from Fisher Scientific Company as solid sodium hypophosphite having the formula $NaH_2PO_2 \cdot H_2O$. This material is water soluble and when the carrier for the coating composition is water, it is merely dissolved into the chemical treating composition or predissolved and added to the chemical treating composition.

Another suitable type of antioxidants is the "higher temperature antioxidants" which are generally effective at temperatures of greater than around 250° to 300° F. These antioxidants are the alkali metal and alkaline earth metal phenyl phosphinates, an example of which is the sodium benzene phosphinate. This material is present in an amount of about 0.01 to about 1 and most preferably 0.01 to 0.1 weight percent of the polymeric-containing composition, although greater amounts can be used if additional benefits are required. An example of sodium benzene phosphinate is that available from Stauffer Chemical Company having the formula $C_6H_6O_2PNa$ with a formula weight of 164. Other examples of suitable higher temperature antioxidants are the thioethers, which includes phenyl-containing thioethers, and polymers thereof. A nonexclusive example of these is di(tridecyl)thiodipropionate with a chemical formula of $S(CH_2CH_2COOC_{13}H_{27})_2$. A suitable thiodipropionate is that available from W. R. Grace & Co. from their Evans Chemetics Unit in Waterloo, New York, under the product name Evanstab 13. The amount of this material is generally in the range of about 1 to about 15 weight percent of the polymeric-containing composition although higher amounts can be used to produce concominant increased advantages. The higher temperature antioxidants are referred to by this terminology because they are more effective at higher temperatures such as in molding reinforced polymers rather than the temperature of drying the reinforcing fibers. The former temperature is usually higher than the latter.

Also, mixtures of these antioxidants are useful in the polymeric containing composition and preferably a mixture is used. The mixture can be of at least one low temperature antioxidant with at least one high temperature antioxidant. The mixture of antioxidants can be incorporated into the coating composition or added in a secondary treatment after the coating as a size has first been applied to the fibers or reinforcement. Also, one antioxidant, either the low or high temperature antioxidant, can be added with the coating composition with subsequent addition of the other type of antioxidant. The ratios of the low temperature antioxidant and the high temperature antioxidant in the mixture is generally in the ratio of around 1:1 to 1:20. The amounts of the low and high temperature antioxidants used in the mixture are the same as those amounts used in their separate addition.

Additionally, the polymeric-containing composition may optionally have present a crosslinking agent to crosslink the crosslinkable polymer. Any composition known to those skilled in the art for crosslinking polymers is suitable. A nonexclusive example is a blocked aliphatic polyisocyanate for instance, a blocked 1,6-hexamethylene diisocyanate-based adduct for crosslinking polyurethane and other polymers. Although monomeric blocked polyisocyanates that are water dispersible may also be used. These materials can be prepared from organic diisocyanates and contain biuret, allophanate or urethane groups or isocyanurate rings. Suitable polyisocyanate usable in preparing adducts for use as the monomer are those known to those skilled in the art such as ethylene diisocyanate; 1,4-tetramethylene diisocyanate; 1,6-hexamethylene diisocyanate, and the like. For polyisocyanate adducts containing biuret groups, any method known to those skilled in the art may be utilized where coreactants such as water, tertiary alcohols, primary and secondary monoamines and primary and secondary diamines can be used. Polyisocyanate adducts containing allophanate groups may be prepared by methods known to those skilled in the art such as British Patent No. 994,890 and German Offenlegungsschrift No. 2,040,645. Also, polyisocyanate adducts containing urea and urethane groups can also be used. Suitable blocking agents for these polyisocyanate adducts are, for example, secondary or tertiary alcohols; C-H acid compounds and other blocking agents known to those skilled in the art. The amount of the crosslinking material that is used is generally a weight ratio of the crosslinking agent to the polymer of around 1:20 to 20:1. Preferably, the crosslinking agent is present and in an amount that is effective in producing a reduced solvent swellable coating from the coating composition upon removal of substantial quantities of the carrier when compared to uncrosslinked coatings. The reduced swellability of residues or films can be measured in accordance with the polymer swellability test of ASTM (American Society of Testing Materials).

A particularly suitable crosslinking agent for the polyurethane is that obtainable from Mobay Corp., Pittsburgh, Pa., under the product name Baybond XW-116 Crosslinker, which has blocked 1,6-hexamethylene diisocyanate-based adduct having components including butylacetate, triethylamine and N-methylpyrrolidone with isocyanueates and which is a yellow liquid with a specific gravity of 1.1 at 25° C., a bulk density of 9.2 pounds per gallon and a percent volatiles of 35 by weight. The amount of the crosslinking agent can be varied depending upon the application. For instance, when the substrate for the coating is fibrous material used in a dark pigmented polymer matrix, higher amounts of the crosslinking material can be used. Otherwise to achieve good color of the reinforced polymer with the chemically treated fibrous material, the amount of the crosslinking agent should not be too great to result in a yellow color upon production of the reinforced polymer. This amount of the crosslinking agent is variable also depending on the amount of the antioxidant present in the chemical treating composition. Higher amounts of antioxidants or more effective antioxidants allow for the use of higher amount of crosslinking agent.

The carrier for the polymeric-containing composition that is a coating composition is any material known to those skilled in the art for applying a coating to a substrate. A nonexclusive example includes applying a size to fibers during their formation or after their formation or to other types of reinforcement. The carrier can be an organic solvent or water or a combination to produce foams and gels of the coating composition. Preferably water is the carrier to give an aqueous coating composition. The water is present in effective amounts to give total solids (nonaqueous content) in the range sufficient for a viscosity for application to the substrate-like fibers for reinforcement. Generally, the water is present in an amount sufficient to give a total solids in the range of about 1 to about 50 weight percent and preferably about 5 to 20 weight percent. In any event for a size composition, the amount of the various components and the amount of water should be balanced so that the viscosity of the coating composition is not greater than around 150 centipoise at 20° C. for coatings that are sizes for fibers. Solutions having viscosities greater than 150 centipoise are difficult to apply as aqueous emulsion, dispersion or solutions to fibers during their formation, especially to glass fibers that are formed from molten streams of glass with standard type application equipment without causing the breakage of the continuity of the fibers. It is preferred that the viscosity of the aqueous size for application to glass fibers during their formation is in the range of about 20 to 60 centipoise at 20° C. for best results. If the aqueous coating composition is prepared with thixotropic agents to make it a foam or gel, then the viscosity will be that appropriate to such formulations and the application equipment will be appropriate for applying foams and gels to the substrates, fibers or reinforcement.

When the coating composition is a size for glass fibers, the size should have in addition to the film forming polymer, at least one organometallic coupling agent like organofunctional silane coupling agent or one or more of its hydrolysis products. Any suitable organofunctional silanes known to those skilled in the art may be used and one particularly suitable silane is the amino organofunctional silanes. Different types of these silane coupling agents and their amounts are like those disclosed in U.S. Pat. No. 4,271,229 (Temple) hereby incorporated by reference. Generally, the amount of the glycidoxy functional silane such as A-187 silane or aminofunctional silane such as A-1100 silane, both available from Union Carbide Corporation, is in the range of about 0.05 to about 2 weight percent of the nonaqueous components of the polymeric-containing composition as a chemical treating composition.

Also, when the coating is a size, there optionally may be present one or more fiber lubricants or mixtures thereof. Nonexclusive examples of suitable lubricants are given in U.S. Pat. No. 4,271,229 (Temple) hereby incorporated by reference. The amount of the lubricant can range from 0 to around 5 weight percent of the nonaqueous solids of the size. A nonexclusive example of a processing aid that is useful in the present invention is an epoxidized polyester disclosed in U.S. Pat. No. 3,459,585 (Killmeyer et al) hereby incorporated by reference. The amount of this epoxy polyester material, which is available through PPG Industries, Inc. under the trade designation RD-1135B, is generally in the range of about 2 to about 15 weight percent based on the nonaqueous components of the size.

The polymeric-containing composition can be prepared by addition of any of the components simultaneously or sequentially to each other. When the polymer-containing composition is a coating composition, it is preferred to predilute all of the components before they are combined and diluted with water into the coating composition. This is to enhance their solubility, dispersibility or emulsifiability.

The coating composition is useful in treating myriad kinds of substances ranging from monolithic structures of glass, wood, metal, ceramic and plastics to fibrous materials that are treated with the sizes like the high modulus fibers such as glass fibers, carbon fibers and polyaramide fibers. Suitable examples of glass fibers include "E-glass" or "621-glass" fibers and low or free boron or fluorine derivatives thereof. The coating composition is applied to the substrate by rolling, padding, painting, brushing or spraying or any other process of application known to those skilled in the art. The size is applied to the fibers preferably in the forming operation of the fibers, and the fibers are formed into continuous strands and dried to remove water as the carrier, and the strands are subsequently chopped. Alternatively, the aqueous size is applied to the fibers in a wet chop forming operation. The amount of the cured or partially cured coating of the aqueous size on the fibers is generally in the range of about 0.1 to about 2 percent LOI (loss of ignition). When the coating composition is applied to substrates, the substrates can be dried in such a manner to avoid formation of undesirable colors, so the drying temperature should not be too high to produce non-white colors when any heat sensitive components are present in the coating composition. When the low temperature antioxidant is present in the coating composition, higher temperatures of drying can be used to enhance the integrity of the fibers comprising the strand or strands of reinforcement. Upon drying, a moisture-reduced coating is formed on a substantial portion of the substrates. Coated substrates like fibers are useful in reinforcing polymers. Generally, drying of the fibers occurs any time before the fibers contact the matrix polymer. The drying temperature is in the range of ambient to around less than 350° F. (177° C.) with lower temperatures requiring longer drying times. Preferably the treated glass fibers are dried at a temperature in the range of about 280° F. to 290° F. (138° C. to 143° C.) for a period of time from 10 to 12 hours to reduce the moisture content of the fibers to about 0. The fibers which include a plurality of fibers can have any secondary chemical treatment applied to them when they are chopped subsequently to their formation. Generally chopped lengths vary from around less than 1/16" to greater than 2," preferably in the range of about ⅛" to around ½".

Another example of substrates to which the coating composition is applicable is the inorganic fillers sometimes used in reinforced polymeric composites. Nonexclusive examples of such inorganic fillers include mica, wollastonite, talc, clay and novaculite. Contacting the fillers with the coating composition is accomplished by spraying or dipping or the like as a convenient way of treating them.

The dried fibers and/or fillers are useful in reinforcing polymeric matrices in any of the molding processes known to those skilled in the art utilizing either chopped strand, continuous strand or a mixture thereof. Preferably, the chopped fiber strands are mixed with the matrix polymer resin in a dry powder mixture to produce a homogeneous batch of matrix polymer. The batch can be compression or injection molded to produce the fiber reinforced polymeric part or shaped device. These chemically treated fibers are used in molding the fiber reinforced polymers such as fiber reinforced polyamides, and polyalkylene terephthalates, including poly(ethylene terephthalate) and poly(butylene terephthalate) and polyphenylene oxide, polystyrenics and other similar polar thermoplastic polymers, copolymers, blends and alloys and polyolefins, poly(vinylacetate), poly(vinyl alcohol), styrene butadiene copolymers and the like.

PREFERRED EMBODIMENT

The preferred embodiment utilizes glass fibers as the substrate that are dry chopped glass fibers having a dried residue of the coating composition as a size where the fibers have a length of around ⅛" to ½". The fibers have conventional filament diameters that can range from around 1 micron to greater than 30 microns but are preferably in the diameter of 10 to 16 microns. The aqueous size preferably has the formulation with ranges of preferred amounts for the components as shown in Table A.

TABLE A

|  | Lbs/100 Gallons | Solids % |
|---|---|---|
| Oil-in-water emulsion of the curable matrix-compatible polyurethane film forming polymer | 68–75 | 40–70 |
| Water for polymer emulsion | 20 gallons | |
| A-1100 gamma-aminopropyl-triethoxy silane | 6–7 | 62 |
| Water for A-1100 | 40 gallons | |
| Hampene NA2 disodium ethylene diamine tetraacetate | 0.15–0.3 | 100 |
| Sodium Hypophosphite | 0.5–1.5 | 100 |
| Water for Hampene and Hypophosphite | 3 gallons | |
| RD-1135B epoxidized polyester | 10–15 | 20 |
| Evanstab 13 Di(tridecyl)thiodipropionate | 2–3 | 100 |
| Baybond XW-116 (blocked aliphatic polyisocyanate crosslinker) | 6–7 | 70 |
| Hot water for Baybond | 3 gallons | |
| Rhoplex E-693 acrylic copolymer | 25–35 | 50 |
| Water for Rhoplex | 3 gallons | • |
| Water for dilution to 100 gallons | | |
| % Solids: | 9.0 ± 0.3 | |
| pH: | 10 ± 0.5 | |
| Viscosity: (cp)* | 3 ± 1 | |
| Temperature (°F.) | 80 ± 10 | |

*cp = centipoise

The aqueous size is formulated by adding the polymer latices to premix tanks with slow stirring and the addition of about 1/5 of the total volume of water as deionized water. In this formulation as acrylic copolymer latex is used which assists in producing improved solvent resistance for reinforcing polyamide. The Rhoplex E-693 material is available from Rohm and Haas Co., Philadelphia, Pa. This material is a white emulsion having a solids content of 49.5 to 50.5 percent with a pH of 4.5 to 6.5 and a viscosity at LVT (1), 60 rpm 20–60 and having the infrared curve of FIG. 1. This copolymer is a self-crosslinking acrylic-type copolymer of the anionic emulsifying type with a density of 20° C. of 8.8 pounds per gallon and a minimum film forming temperature of +12° C. and a temperature at which the torsional modulus of an air dried film is 300 kilograms per centimeter$^2$ of +24° C. About 2/5 of the total volume of water is added to a main mix tank and the amino organofunctional silane is added to this deionized water with slow stirring. The polymer latex premixes are added to the silane mixture in the main mix tank. To a premix tank a sufficient amount of deionized water is added to dissolve the ethylene diamine tetraacetic acid and the sodium hypophosphite with stirring. This solution is then transferred to the main mix tank. The epoxy polyester polymer is added to a tank with an Eppenbach mixer with a small amount of water and the yellowish liquid di (tridecyl) thiodipropionate is added to this mixture and stirred for 5 minutes and added to the main mix tank. The polyisocyanate crosslinking agent is added to a premix tank and has added to it how water with stirring. After the emulsion forms, it is stirred for 5 minutes and then added to the main mix tank. The acrylic copolymer is added to a premix tank with a small amount of water, around 1/30 of the total volume of water needed for the chemical treating composition and the mixture is stirred for 5 minutes and added to the main mix tank. The acrylic copolymer is added to a premix tank with a small amount of water, around 1/30 of the total volume of water needed for the chemical treating composition and the mixture is stirred for 5 minutes and added to the main mix tank. The aqueous chemical treating composition is diluted with dionized water to its final desired volume. The aqueous size is applied to glass fibers during their formation, preferably those having a G-fiber diameter, and the treated fibers are formed into strands, but the strand formation can be anything ranging from DE-75 to around K-18, but preferably the strand construction is G-31 strands. The aqueous size is applied at such a rate to give an LOI on the strand of around 1 to 1.4 weight percent of the treated strand.

After the treated glass fiber strands are formed into a forming package of continuous fiber wound in overlapping layers on a winder, a plurality of the packages are dried at a temperature around 285° F. (141° C.) for a period of around 11 hours. This drying removes water and at least partially cures the polymer through the crosslinking agent to the coating. A plurality of the dried packages are located so that the strands can be removed from the packages and preferably treated with an antistat and alkali metal phenyl phosphinate antioxidant as a post treatment before the fibers are chopped into dry chopped strands. The dry chopped strands are preferably molded with polyamide resin in injection molding processes to produce fiber reinforced polyamide having good oxidative stability.

EXAMPLES

Nine aqueous polymer-containing compositions were prepared in a manner similar to that of the preferred embodiment with similar components except for the presence of different film forming polymers as shown in Table 1. The film forming polymers were added to the formulation in the same manner as was done for the preferred embodiments. Also, Table 1 shows two repeats for example 3 and these are labeled as "3b" and "3". Also, Table 1 shows illustrative example A through G for comparison purposes. In Table 1 the epoxy resin emulsions are available from Interez in Louisville, Kentucky. Resin RDX-84853 is an epoxy novolac having 6 3percent solids dispersion and a viscosity at 10 rpm with a #5 spindle of 9800 centipoise at 25° C. This material also has a weight per epoxide of 225 and a weight/gallon of 9.3.

TABLE 1

|  | 1 % Solids | 2 | 3 | Ill. Eg. A | Ill. Eg. B | Ill. Eg. C | 4 | 5 |
|---|---|---|---|---|---|---|---|---|
| Epoxy-novolac emulsion RDX-84853 | 59.6 | — | — | — | — | — | 14.9 | 14.9 |
| Epoxy polymer emulsion (CMD-35201) | — | — | — | — | — | — | — | — |
| (CMD-W60-5520) | — | — | — | — | — | — | — | — |
| Polyvinylalcohol copolymer Vinex 4004 A9 | — | — | — | — | — | — | — | — |
| Curable polyurethane emulsion |  |  |  |  |  |  |  |  |
| (Witco 290 H) | 14.9 | 75 | 47.2 | 75 | 47.2 | 47.2 | 59.6 | — |
| (Baybond 402A) | — | — | — | — | — | — | — | 59.6 |
| Gamma aminopropyltriethoxy silane A-1100 silane | 25 | 20 | 17 | 20 | 17 | 17 | 25 | 25 |
| Glycidoxypropyltrimethoxy silane (A187) | — | — | — | — | — | — | — | — |
| AzCup N | — | — | — | — | — | — | — | — |
| Epoxy polyester process aid (RD-1135B) | 5.0 | 4.7 | 4.7 | 4.7 | — | — | 4.7 | 4.7 |
| Disodium salt of ethylene diamine tetraacetate, dihydrate (EDTA) | 1.0 | 1.0 | 1.0 | — | — | — | 1.0 | 1.0 |
| Sodium hypophosphite | 2.5 | 2.5 | 2.5 | — | — | — | 2.5 | 2.5 |
| Blocked aliphatic polyisocyanate crosslinking agent |  |  |  |  |  |  |  |  |
| Mobay XW-116 | — | — | 11.8 | — | 11.8 | 11.8 | — | — |
| Mobay XW-116M | — | — | 23.7 | — | 23.7 | 23.7 | — | — |
| Di(tridecyl) thiodipropionate Evanstab-13 antioxidant | 3.5 | 3.5 | 3.5 | — | — | — | 3.5 | 3.5 |
| Polyoxyethylene (Polyox WSR-301) | 0.2 | 0.2 | 0.2 | 0.2 | 0.2 | 0.3 | 0.3 | 0.3 |
| Y-5823 | — | — | — | — | — | — | — | — |
| Water to final volume of 1 gallon | — | — | — | — | — | — | — | — |

|  | 6 | Ill. Eg. D | Ill. Eg. E | 7 gm/gal | 8 gm/gal | Ill. Eg. F gm/gal | 9 gm/gal | Ill. Eg. G |
|---|---|---|---|---|---|---|---|---|
| Epoxy-novolac | 14.9 | 14.9 | 14.9 | — | 154.2 | — | — | — |
| Epoxy polymer emulsion (CMD-35201) | — | — | — | 154.2 | — | 154.2 | — | — |
| (CMD-W60-5520) | — | — | — | — | — | — | 154 | 154 |
| Polyvinylalcohol copolymer Vinex 4004 A10 | — | — | — | — | — | — | 86 | 86 |
| Curable polyurethane emulsion |  |  |  |  |  |  |  |  |
| (Witco 290 H) | — | 59.6 | — | 277.8 | 277.8 | 277.8 | — | — |
| (Baybond 402A) | — | — | 59.6 | — | — | — | — | — |
| (Mobay) | 59.6 | — | — | — | — | — | — | — |
| Gamma aminopropyltriethoxy silane A-1100 silane | 29.7 | 25.0 | 25.0 | — | — | — | — | — |
| Glycidoxypropyltrimethoxy silane (A187) | — | — | — | 81.3 | 81.3 | 81.3 | — | — |
| AzCup N | — | — | — | — | — | — | 165 | 165 |
| Epoxy polyester process aid (RD-1135B) | 4.7 | — | — | 70.7 | 70.7 | 70.7 | — | — |
| Disodium salt of ethylene diamine | 1.0 | — | — | 1.0 | 1.0 | — | 1.0 | — |

TABLE 1-continued

| | | | | | | | | |
|---|---|---|---|---|---|---|---|---|
| tetraacetate, dihydrate (EDTA) | | | | | | | | |
| Sodium hypophosphite | 2.5 | — | — | 10.0 | 10.0 | — | 10.0 | — |
| Blocked aliphatic polyisocyanate crosslinking agent | | | | | | | | |
| Mobay XW-116 | — | — | — | — | — | — | — | — |
| Mobay XW-116M | — | — | — | — | — | — | — | — |
| Di(tridecyl) thiodipropionate | 3.5 | — | — | 10.0 | 10.0 | — | 10.0 | — |
| Evanstab-13 antioxidant | | | | | | | | |
| Polyoxyethylene (Polyox WSR-301) | 0.3 | — | 0.3 | 1.0 | 1.0 | — | 1.0 | — |
| Y-5823 | — | — | — | — | — | — | 45.5 | 45.5 |
| Water to final volume of 1 gallon | — | — | — | — | — | — | — | — |

Figure 1B:
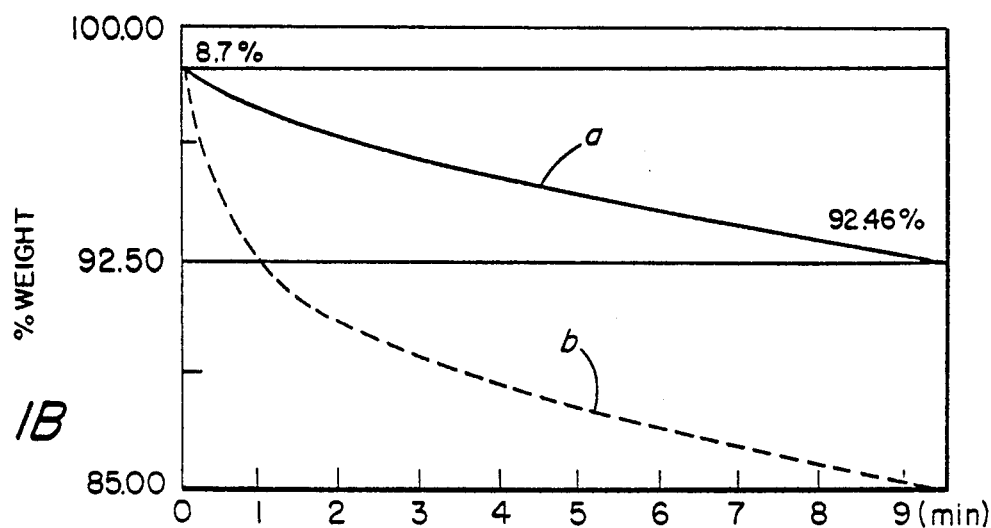
Figure 1C:
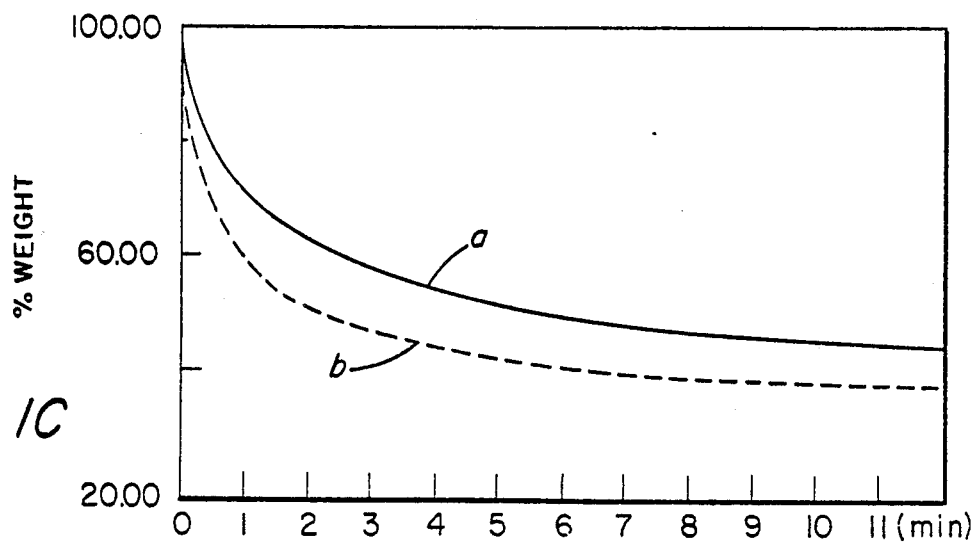

FIG. 1 shows three isothermal thermal gravimetric analyses (TGA), a film of polyurethane, A-1100 silane, epoxy polyester processing aid, EDTA and sodium hypophosphite which is indicated as "A". Also shown in the TGAs for a film of polyurethane, A-1000 silane, epoxy polyester (RD1135B) and dibutylphthalate indicated as B. The temperatures of the TGAs in FIG. 1 are 180° C. for I, 275° C. for II and 355° C. for III. the difference in weight loss between "A" and "B" in each graph is: 8.4496 for I, 7.7467 for II and 6.5606 for III. This indicates improved thermal aging of film having at least two of the stabilizing agents.

Figure 2:
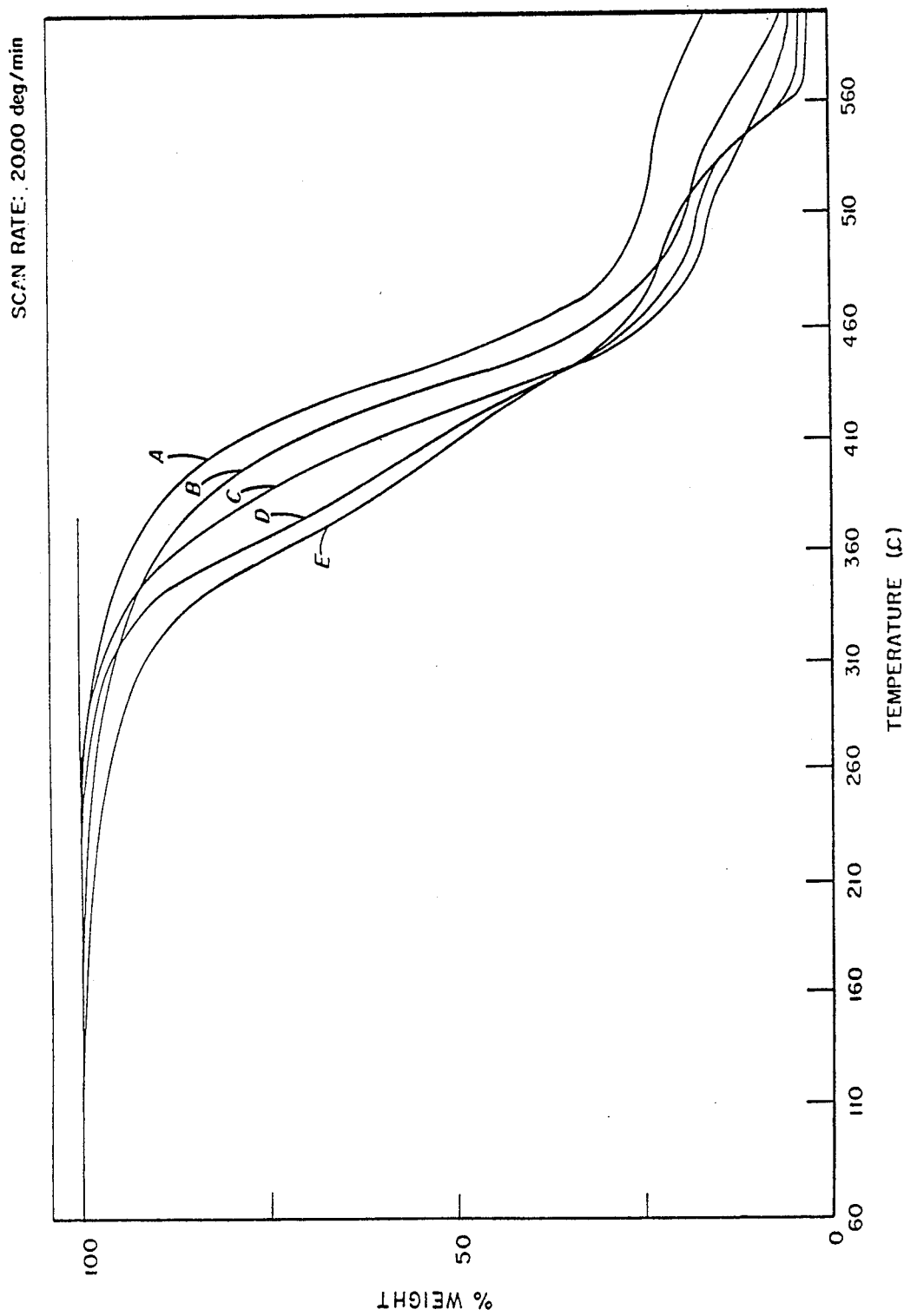
FIG. 2 is a series of three thermal gravimetric analysis curves of dried residues of chemical treating compositions having various components.

FIG. 2 illustrates the improvement in thermal stability for the dried residue of the polymeric-containing composition. FIG. 2 is a composite of five thermal gravimetric analyses (TGA) curves showing the improved thermal stability of dried residues having components of the present invention for curves A, B and C over curves D and E. Curves D and E are the TGA curves for a residue produced in accordance with U.S. Pat. No. 4,271,229. Curve B is the TGA curve of the residue have a polyurethane polymer, the acrylic copolymer, aminosilane, the epoxy polyester polymer processing aid sodium hypophosphate and EDTA formed into a residue by drying the aqueous chemical treating composition. Curve A is a residue similar to that of the TGA curve of Curve B for a dried residue of the preferred embodiment. Curve C is for a film similar to that of Curve B where the acrylic copolymer is absent. Curves A, B and C are further to the right that Curves D and E showing the improvement in thermal stability from a material similar to U.S. Pat. No. 4,271,229.

Seven sizes of Table 1 and sizes of illustrative examples A, B and D-F were applied to a plurality of K-fibers that were gathered into strands. The strands were prepared into wet chopped strands of ⅛" and dried in a manner similar to that of the preferred embodiment. These fibers were used in injection molding with poly(butylene terephthalate) resin, and molded into tensile bars and disks having around 30 weight percent glass. The reinforced PBT samples were tested for tensile strength, flexural strength, flex modulus and Izod impact according to standard ASTM test methods, including respectively D-638, D-790 and D-256. These data are presented in Table 2. Also, Table 2 presents data for a funnel flow test which qualifies glass fibers for handleability and processability in forming reinforced polymers. The funnel flow test was conducted by placing a given quantity of chopped glass fiber strands that were dry chopped in a funnel equipped for vibration. The time it took that total weight to pass through the funnel was recorded. The long term heat aging was conducted by placing the samples in a temperature environment of 170° C. for various times: 500, 1000 and 1500 hours, and tensile strength tests were conducted on the heat aged samples by the same ASTM tensile strength test as used for the initial tensile strength measurement.

Table 2 shows the chemically treated fibers of the present invention have comparable, initial, tensile strength, flexural strength and flexural modulus and Izod impact values to the fibers produced in accordance with U.S. Pat. No. 4,615,946 as "Commercial A" and to commercially available fibers as "Commercial B". Also, the fibers of the present invention have improved heat aging properties to those of the fibers produced in the illustrative examples.

TABLE 2

Films as Dried Size on Glass Fibers Reinforcing Polymers

| | 1 | 2 | 3 | 3b | 3c | Ill. Eg. A | Ill. Eg. B |
|---|---|---|---|---|---|---|---|
| Loss on Ignition (LOI) of film on glass fiber | 1.26 | 1.18 | 1.22 | — | 1.16 | 0.66 | 0.81 |
| PD-104-6 of glass fiber | 3.7 | 1.2 | 0.5 | — | 2.8 | 16.5 | 10.0 |
| Polymer matrix | PBT | PBT | PBT | — | PBT | PBT | PBT |
| Unnotched Izod | 11.2 | 12.2 | 12.2 | 14.2 | 14.7 | 13.7 | 11.8 |
| Izod | 1.81 | 1.94 | 1.98 | 2.03 | 2.05 | 2.0 | 2.08 |
| Tensile psi | 19,070 | 19,370 | 19,290 | 19,430 | 19,710 | 19,940 | 20,240 |
| Tensile after heating as indicated hours at 170° C.: | | | | | | | |
| 500 hours | 20,390 | 20,420 | 19,560 | 18,620 | 19,720 | 15,400 | 17,260 |
| 1000 hours | 19,010 | 17,850 | 15,560 | — | — | 12,780 | 15,210 |
| 1500 hours | 16,003 | 15,580 | 14,420 | — | — | 11,540 | 12,880 |
| Flexural modulus (at 50 lbs stress) (psi) | — | — | — | 0.961 | 0.961 | — | — |
| Flexural strength (psi) | — | — | — | 31,270 | 30,970 | — | — |

| | 4 | 5 | 6 | Ill. Eg. D | Ill. Eg. E | 7 | Ill. Eg. F | Commercial A | Commercial B |
|---|---|---|---|---|---|---|---|---|---|
| Loss on Ignition (LOI) of film on glass fiber | 1.12 | 1.05 | 1.04 | 1.05 | 0.971 | 1.26 | 0.96 | — | — |
| PD-104-6 of glass fiber | 1.5 | 1.2 | 1.5 | 1.3 | — | 11.0 | 26.0 | — | — |

TABLE 2-continued

| Films as Dried Size on Glass Fibers Reinforcing Polymers | | | | | | | | | |
|---|---|---|---|---|---|---|---|---|---|
| Polymer matrix | PBT | PBT | PBT | PBT | PBT | Acetal | Acetal | PBT | PBT |
| Unnotched Izod | 14.4 | 13.4 | 13.5 | 13.9 | 12.7 | 12.2 | 12.3 | — | — |
| Izod | 2.10 | 2.05 | 2.00 | 2.07 | 2.01 | 1.92 | 2.00 | — | — |
| Tensile psi | 19,820 | 19,600 | 19,630 | 19,950 | 19,510 | 17,060 | 17,520 | 19,860 | 20,250 |
| Tensile after heating as indicated hours at 170° C.: | | | | | | | | | |
| 500 hours | 20,060 | 20,290 | 19,610 | 14,590 | 13,670 | 14,980* 14,930* | 15,070* 14,030* | 20,080 | 20,410 |
| Flexural modulus (at 50 lbs stress) (psi) | 1.02 | 0.99 | 0.975 | 0.986 | 0.971 | — | — | 0.992 | 1.01 |
| Flexural strength (psi) | 32,230 | 32,080 | 31,660 | 31,920 | 31,150 | — | — | 31,640 | 31,940 |

Ill Eg. = Illustrative example
PBT = poly(butylene terephthalate)
*Ex 7 & Ex F were tested at 150° C. at 1 week intervals.

From Table 2 comparisons can be made from the examples and illustrative examples. In comparing Example 2 and Illustrative Example A an improved long-term heat resistance (LTHR) is shown by less of a reduction in tensile strength after long-term heat aging (LTHA). This is also shown in comparing Examples 3, 3b, and 3c and Illustrative Example B. Again, this is shown in comparing Example 4 and Illustrative Example D and Example 5 and Illustrative Example E. Also, the percentage decrease in tensile from original to that after LTHA is less for Example 5 than for Illustrative Example F.

We claim:

1. Glass fibers having a thin film over a substantial portion of the surfaces of the fibers of the dried residue of an aqueous size composition, comprising:
   a. a film forming polymer selected from the group consisting of liquid polymers and polymers present in an oil-in-water emulsion or dispersion, wherein the liquid polymers are selected from the group consisting of polyalkylene glycols, polyoxyalkylene glycols, where the alkylene groups are ethylene and propylene or copolymer combinations thereof, and wherein the polymers present in an emulsion or dispersion are selected from the group consisting of polyoxyalkylene glycols, where the alkylene groups are ethylene and propylene or copolymer combinations thereof; polyvinylalcohol; polyvinylacetate; starch; theremoplastic polyesters; and
   b. crosslinking agent selected from the group consisting of: blocked aliphatic polyisocyanate and its adducts containing biuret or allophanate groups, wherein the blocking agents are secondary or tertiary alcohols or C-H acid compounds and where the weight ratio of the crosslinking agent to the polymer is around 1:20 to 20:1.

2. Glass fibers of claim 1, wherein the crosslinking agent is selected from the group consisting of blocked aliphatic polyisocyanate and monomeric blocked polyisocyanates that are water dispersible prepared from organic diisocyanates which contain biuret, allophanate, urethane groups or isocyanate rings.

3. Glass fibers of claim 2, wherein the blocked aliphatic polyisocyanate is a blocked 1,6-hexamethylene diisocyanate-based adduct with isocyanurate.

4. Glass fibers of claim 3, which includes an organometallic coupling agent including organofunctional silane coupling agent.

5. Glass fibers of claim 4 wherein the size is present on the fibers in the range of about 0.1 to about 2 percent LOI.

6. Aqueous size composition for glass fibers, comprising:
   a. a film forming polymer selected from the group consisting of liquid polymers and polymers present in an oil-in-water emulsion or dispersion, wherein the liquid polymers are selected from the group consisting of polyalkylene glycols, polyoxyalkylene glycols, where the alkylene groups are ethylene and propylene or copolymer combinations thereof, and wherein the polymers present in an emulsion or dispersion are selected from the group consisting of polyoxyalkylene glycols, where the alkylene groups are ethylene and propylene or copolymer combinations thereof; polyvinylalcohol; polyvinylacetate; starch; thermoplastic polyesters; and
   b. crosslinking agent selected from the group consisting of: blocked aliphatic polyisocyanate and its adducts containing biuret or allophanate groups, wherein the blocking agents are secondary or tertiary alcohols or C-H acid compounds and where the weight ratio of the crosslinking agent to the polymer is around 1:20 to 20:1.

7. Composition of claim 6, wherein the crosslinking agent is selected from the group consisting of blocked aliphatic polyisocyanate and monomeric blocked polyisocyanates that are water dispersible prepared from organic diisocyanates which contain biuret, allophanate, urethane groups or isocyanate rings.

8. Composition of claim 7, wherein the blocked aliphatic polyisocyanate is a blocked 1,6-hexamethylene diisocyanate-based adduct with isocyanurate.

9. Composition of claim 7, which includes an organometallic coupling agent including organofunctional silane coupling agent.

10. Composition of claim 9, wherein the organofunctional silane coupling agent is selected from the group consisting of: glycidoxy functional silane and amino functional silane.

11. Composition of claim 9, wherein the water dispersible polymer comprises about 2 to about 30 weight percent of the size and organo silane comprises about 0.05 to about 2 weight percent of the nonaqueous components of the size.

12. Composition of claim 9 further comprising a lubricant.

13. Composition of claim 12, wherein the lubricant comprises from greater than 0 to around 5 weight percent of the nonaqueous solids of the size.

* * * * *

UNITED STATES PATENT AND TRADEMARK OFFICE
CERTIFICATE OF CORRECTION

PATENT NO. : 5,247,004
DATED : September 21, 1993
INVENTOR(S) : Swisher, et al

It is certified that error appears in the above-indentified patent and that said Letters Patent is hereby corrected as shown below:

Abstract, Line 7, "Fibrous" should read -- fibrous --.

Signed and Sealed this

Nineteenth Day of August, 1997

*Attest:*

BRUCE LEHMAN

*Attesting Officer*     *Commissioner of Patents and Trademarks*